United States Patent
Iverson et al.

(10) Patent No.: US 9,809,775 B2
(45) Date of Patent: Nov. 7, 2017

(54) INFUSED HIGH BTU COMBUSTION COMPOSITION AND METHOD OF MAKING AND USING THE SAME

(71) Applicant: Superior Coatings Group, LLC, Richfield, MN (US)

(72) Inventors: Hans E. Iverson, Richfield, MN (US); Kerstin K. Iverson, Richfield, MN (US)

(73) Assignee: IHB TECHNOLOGIES, INC., Minneapolis, MN (US)

( * ) Notice: Subject to any disclaimer, the term of this patent is extended or adjusted under 35 U.S.C. 154(b) by 125 days.

(21) Appl. No.: 14/532,551

(22) Filed: Nov. 4, 2014

(65) Prior Publication Data

US 2015/0121749 A1 May 7, 2015

Related U.S. Application Data

(60) Provisional application No. 61/925,270, filed on Jan. 9, 2014, provisional application No. 61/899,446, filed on Nov. 4, 2013.

(51) Int. Cl.
| | |
|---|---|
| *C10L 5/44* | (2006.01) |
| *C10L 9/10* | (2006.01) |
| *C10L 5/36* | (2006.01) |
| *C10L 10/00* | (2006.01) |
| *C10L 5/14* | (2006.01) |
| *C10L 5/32* | (2006.01) |
| *C10L 5/40* | (2006.01) |

(52) U.S. Cl.
CPC ............... *C10L 9/10* (2013.01); *C10L 5/146* (2013.01); *C10L 5/32* (2013.01); *C10L 5/361* (2013.01); *C10L 5/363* (2013.01); *C10L 5/406* (2013.01); *C10L 5/442* (2013.01); *C10L 5/445* (2013.01); *C10L 10/00* (2013.01); *C10L 2200/0469* (2013.01); *C10L 2250/04* (2013.01); *C10L 2290/24* (2013.01); *C10L 2290/28* (2013.01); *C10L 2290/30* (2013.01); *Y02E 50/10* (2013.01); *Y02E 50/30* (2013.01)

(58) Field of Classification Search
CPC .......... C10L 5/442; C10L 5/445; C10L 5/361
USPC .................................. 44/550–599, 605, 606
See application file for complete search history.

(56) References Cited

U.S. PATENT DOCUMENTS

| | | | |
|---|---|---|---|
| 6,165,238 A | 12/2000 | Parkinson et al. | |
| 7,960,325 B2 * | 6/2011 | Kluko | C10L 5/363 44/605 |
| 2007/0151145 A1 * | 7/2007 | Felger | C10L 5/363 44/551 |

(Continued)

FOREIGN PATENT DOCUMENTS

| | | |
|---|---|---|
| EP | 2463357 A1 | 6/2012 |
| WO | 2013/027082 A1 | 2/2013 |

OTHER PUBLICATIONS

International Search Report and Written Opinion of the International Searching Authority dated Jan. 19, 2015, 10 pages.

*Primary Examiner* — Ellen McAvoy
(74) *Attorney, Agent, or Firm* — Fox Rothschild LLP

(57) ABSTRACT

An organic fuel additive for improving the combustion of a bioenergy solid fuel product, the organic fuel additive comprising a mixture of combustible organic fines and a polymer material, wherein the polymer material encapsulates the combustible organic fines in solid form, and methods of making and using the same.

14 Claims, 17 Drawing Sheets

(56) References Cited

U.S. PATENT DOCUMENTS

| | | | |
|---|---|---|---|
| 2008/0022586 A1* | 1/2008 | Gilbert | C10L 5/12 44/490 |
| 2008/0171297 A1* | 7/2008 | Reynolds | C10L 5/363 432/1 |
| 2010/0300368 A1* | 12/2010 | Myers | A01K 1/0154 119/171 |
| 2011/0197501 A1* | 8/2011 | Taulbee | C10L 5/04 44/553 |
| 2011/0209392 A1 | 9/2011 | Kunik et al. | |
| 2015/0128487 A1* | 5/2015 | Myers | C10L 5/08 44/576 |

* cited by examiner

IHB – ANALYTICAL TESTING

| | MOISTURE-TOTAL RECEIVED | ASH CONTENT | SULFUR CONTENT | SULFUR DIOXIDE CONTENT | GROSS CALORIC VALUE | GROSS CALORIC VALUE |
|---|---|---|---|---|---|---|
| METHOD | ASTM D3173 | ASTM D1102 | ASTM D4239 | CALCULATED | ASTM D5865 | ASTM D5865 |
| SAMPLE SIZE | | 1.0 GRAM | 0.2 GRAM | | 0.75 GRAM | 0.75 GRAM |
| UNITS | VOL / VOL | WT % | WT % | LB / MM BTU | J / G | BTU / LB |
| *IHB COMMODITY* | | | | | | |
| A⊚ – AC5 GRADE [50 μm] RAW MATERIAL | 1.010 | 16.210 | 0.560 | 0.880 | 2824.00 | 12142.00 |
| (IHB ENCAPSULATED [800 μm] A⊚ & BW439 (50% / EA)) | 0.340 | 6.460 | 0.370 | 0.430 | 37866.00 | 16280.00 |
| *STANDARD – PELLET & BRIQUETTE W/O IHB* | | | | | | |
| A | 3.340 | 0.270 | 0.011 | 0.023 | 19113.00 | 8218.00 |
| B | 6.640 | 0.460 | 0.006 | 0.014 | 19514.00 | 8390.00 |
| C | 4.160 | 0.250 | 0.010 | 0.022 | 19044.00 | 8188.00 |
| D | 10.070 | 4.490 | 0.039 | 0.103 | 16884.00 | 7259.00 |

FIG. 9

| AURI LAB # | SAMPLE DESCRIPTION |
|---|---|
| 1 | WOOD CONTROL |
| 2 | WOOD WITH 5% IHB |
| F | ASPEN CONTROL |
| 3 | ASPEN WITH 3% IHB |
| 4 | ASPEN WITH 5% IHB |
| 5 | ASPEN WITH 8% IHB |
| 6 | ASPEN WITH 8% IHB - NO STEAM |
| 7 | ASPEN WITH 3% IHB |
| 8 | ASPEN WITH 5% IHB |

| ASSAY | METHOD # |
|---|---|
| MOISTURE | ASTM E871 |
| ENERGY | ASTM E711 |
| ASH | ASTM D1102 |

ASSAY RESULTS

| AURI LAB # | MOISTURE (%) | AS IS BASIS | | DRIED BASIS | |
|---|---|---|---|---|---|
| | | ENERGY (BTU/LB) | ASH (%) | ENERGY (BTU/LB) | ASH (%) |
| 1 | 7.78 | 7813 | 0.82 | 8472 | 0.89 |
| 2 | 5.74 | 8395 | 0.62 | 8906 | 0.66 |
| F | 5.66 | 7966 | 0.80 | 8444 | 0.85 |
| 3 | 5.37 | 8193 | 0.95 | 8658 | 1.00 |
| 4 | 5.37 | 8397 | 1.00 | 8874 | 1.06 |
| 5 | 6.03 | 8506 | 1.12 | 9052 | 1.19 |
| 6 | 4.40 | 8731 | 1.20 | 9133 | 1.26 |
| 7 | 5.86 | 8243 | 0.94 | 8756 | 1.00 |
| 8 | 6.11 | 8347 | 1.07 | 8890 | 1.14 |

FIG. 10

DATA OF IHB PERMEATED PELLETS RESTING IN WATER

| PRODUCT | GRAMS LIQUID / GRAM PRODUCT ONE MINUTE TEST | GRAMS LIQUID / GRAM PRODUCT FIFTEEN MINUTE TEST | GRAMS LIQUID / GRAM PRODUCT SIXTY MINUTE TEST |
|---|---|---|---|
| EXAMPLE 3 | 0.1 | 0.1 | 0.4 |
| EXAMPLE 4 | 0.1 | 0.1 | 0.3 |

FIG. 11

INFUSED HIGH BTU COMBUSTION COMPOSITION AND METHOD OF MAKING AND USING THE SAME

CROSS-REFERENCE TO RELATED APPLICATIONS

The present application claims the benefit of U.S. Provisional Application 61/925,270, filed Jan. 9, 2014 and claims the benefit of U.S. Provisional Application 61/899,446, filed Nov. 4, 2013.

BACKGROUND OF THE INVENTION

The present invention generally relates to bioenergy solid fuel products. More particularly, the present invention relates to clean burning bioenergy solid fuel products and methods of making the same.

Due to diminishing quantities of coal, petroleum, and natural gas products, attention is being directed to found renewable fuel sources of energy. With the growing interest in renewable energy, the use of bio-mass-based fuel pellets has increased considerably.

Also, the recent surge in pricing for natural gas and fossil fuels has dramatically increased energy production to alternatives such as heating that utilizes bio-mass-based raw materials, particularly in Europe and North America resulting in the emergence of a sizeable industry for bio-mass-based fuel products. Thus, the demand for bioenergy fuel sources, such as those made from pellets of compressed biomass, such as wood pellets made from forestry products such as compacted saw dust, leftover logging material, wood chips or other energy product sources such as soy pellets, palm kernel shell, coconut shell, cellulose, grass, and other types, or from agricultural products such as straw, alfalfa, corn. Or other types such as domestic and municipal wastes have increased dramatically.

Furthermore, while coal has been a popular alternative, there are concerns with carbon dioxide and sulfur emissions as well as the desirability of having a more ecological renewable material resource for use as an alternative fuel option.

There remains a need in the art for an improved bioenergy solid fuel product based on sustainable/renewable resources that also exhibits high energy during combustion as measured in BTUs (British Thermal Unit), that also burns efficiently, cleanly and safely.

Without limiting the scope of the invention a brief summary of some of the claimed embodiments of the invention is set forth below. Additional details of the summarized embodiments of the invention and/or additional embodiments of the invention may be found in the Detailed Description of the Invention below.

SUMMARY OF THE INVENTION

In one aspect, the present invention relates to an organic fuel additive for improving the BTUs of a solid fuel product. The additive comprises a mixture including combustible organic fines and a polymer material, wherein the combustible organic fines are encapsulated in the polymer material in solid form.

In another aspect, the present invention relates to a bioenergy solid fuel product for combustion burning. The bioenergy solid fuel product is formed from a mixture of a biomass and a fuel additive for increasing the BTUs of the bioenergy solid fuel product. The fuel additive is a mixture of combustible organic fines and a polymer material, wherein the fuel additive is infused into the biomass in the bioenergy solid fuel product.

In another aspect, the present invention relates to a method of making an organic fuel additive for a combustion burning bioenergy solid fuel product. The method may include the steps of providing combustible organic fines, providing a polymer material, increasing the temperature to bring the polymer material to a liquid state, mixing the combustible organic fines and polymer material, congealing the mixture to form droplets and forming the droplets into pastilles or spheres, wherein the polymer material encapsulates the combustible organic fines.

The droplets of congealed combustible organic fines and polymer material can further be formed into pastilles or spheres, mixed with a biomass, and compacted at an elevated temperature and pressure to form a solid fuel product wherein the fuel additive is infused in the biomass.

These and other aspects, embodiments and advantages of the present disclosure will become immediately apparent to those of ordinary skill in the art upon review of the Detailed Description and Claims to follow.

BRIEF DESCRIPTION OF THE DRAWINGS

FIG. 9 is a table illustrating the significant increase in moisture resistance, reduced moisture content and increased caloric energy in BTUs of bioenergy solid fuel products having the organic fuel additive, and a control of a wood solid fuel product having no organic fuel additive.

FIG. 10 is a table illustrating the significant increase in moisture resistance, reduced Moisture content and increased caloric energy in BTUs of solid fuels products with the organic fuel additive, and a control of a wood solid fuel pellet having no organic fuel additive.

FIG. 11 is a table illustrating the moisture resistance of a biomass infused with the organic fuel additive, namely, the IHB bioenergy solid fuel product.

DETAILED DESCRIPTION OF THE INVENTION

Figure 1:
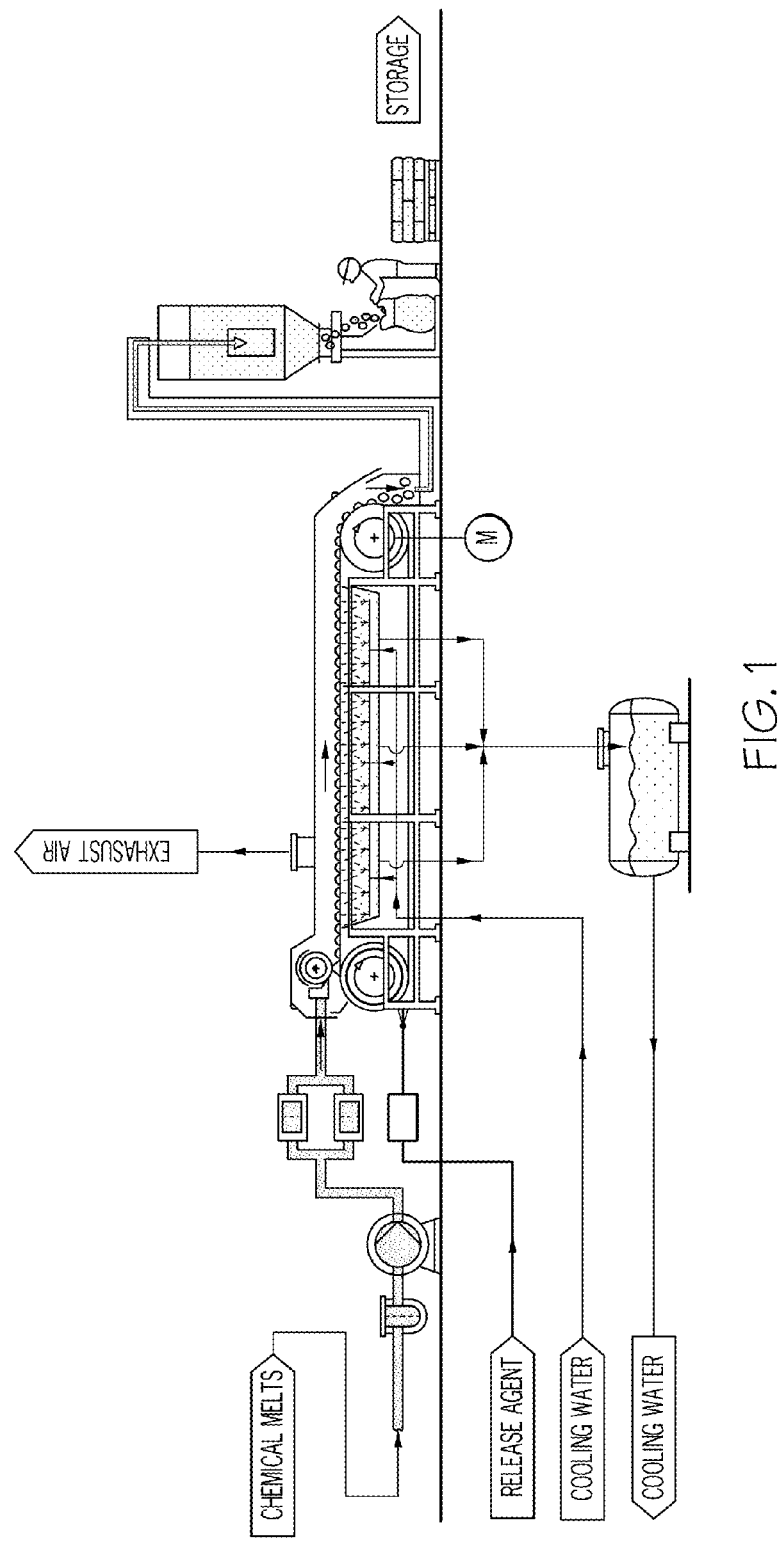
FIG. 1 is a blow flow diagram illustrating a process of making an organic fuel additive pastille or sphere.

While embodiments of the present disclosure may take many forms, there are described in detail herein specific embodiments of the present disclosure. This description is an exemplification of the principles of the present disclosure and is not intended to limit the disclosure to the particular embodiments illustrated herein.

In some embodiments, the present invention relates to an organic fuel additive for improving the combustion of a solid fuel product. The organic fuel additive is a mixture of combustible organic fines and a polymer material, wherein the polymer material encapsulates the organic fines in solid form.

Any suitable combustible organic fines can be employed herein including carbon fines or wood fines.

In some embodiments, the organic fuel additive includes particles of a hard coal-type product having a mean particle size of about 0.05 microns to about 1000 microns, more suitably about 0.05 microns to about 500 microns, more suitably about 0.05 microns to about 150 microns, or wood fines.

In some embodiments, the organic fuel additive includes particulates of anthracite or other coal derivatives, or aspen or pine wood fines.

In some embodiments, the organic fuel additive includes an ultra high grade anthracite.

The raw material size of the combustible organic fines may be reduced using a specialty milling or grinding system including, but not limited to, ball milling, bead milling, basket milling, roller milling, jet milling, pin milling, hammer milling, jaw milling, and so forth.

Suitably, the particle size of the combustible organic fines is reduced in this manner to a mean (d50) particle size of about 50 nanometer (0.05 microns) to about 1 mm (1000 microns), suitably about 5 microns to about 500 microns, or about 50 microns to about 150 microns.

The polymer may be any suitable organic polymer material that is a solid at room temperature. Suitably, the polymer material has a congealing temperature of about 40° C. to about 125° C. (about 100° F. to about 260° F.), more suitably 150° F. and about 250° F., even more suitably about 175° F. to about 225° F., even more suitably about 180° F. to about 200° F. This makes processing and handling more efficient.

In some embodiments, the polymer material has a congealing temperature of about 180° F.

Suitably, the polymer material is relatively tack-free, or tack-free at room temperature so as to avoid adhesion or blocking during processing and handling.

Any suitable polymer material may be employed herein including, but not limited to, polymers of olefins, vinyls, esters, ethers, imides, amides, urethanes, styrene, and so forth, as well as copolymers and terpolymers thereof, as well as mixtures thereof.

Examples include, but are not limited to polymers, copolymers and terpolymers of ethylene including, but not limited to polyethylene, polypropylene, polybutene, and copolymers thereof including those formed with vinyl acetate, n-butyl acrylate, methyl(meth)acrylate, ethyl acrylate, and so forth.

In some embodiments, the polymer material has a straight or branched chain hydrocarbon backbone.

In some embodiments, the polymer material includes a wax. Any suitable wax can be herein, including, but not limited to, paraffin wax, microcrystalline wax, synthetic wax, or functionalized versions of these. Various waxes can be purchased from, for example, Exxon Mobil Chemical, Calumet, and Baker Petrolite.

In some embodiments, the modified polymer is a hydrocarbon wax, suitably, a premium combustible hydrocarbon wax.

In some embodiments, the polymer material is a paraffin wax or beeswax.

One specific example is Prowax 390 commercially available from Exxon Mobil Chemical.

The polymer material may further include a fuel intensifying substance. These substances may be plasticizers, for example.

Fuel intensifying substances include, but are not limited to, mineral oil, a by-product of the fuel industry, and synthetic plasticizers including ester based plasticizers.

In some embodiments, the fuel intensifying substance is mineral oil.

Other polymer additives well known in the art may be employed as well including plasticizers.

The organic fuel additive may include about 20 wt-% to about 60 wt-% combustible organic fines and about 80 wt-% to about 40 wt-% polymer material, more suitably about 30 wt-% to about 50 wt-% combustible organic fines and about 70 wt-% to about 50 wt-% polymer material.

In some embodiments, the organic fuel additive may include about 40 wt-% combustible organic fines and about 60 wt-% modified polymer or a mixture of about 50 wt-% combustible organic fines and 50 wt-% polymer material.

In some embodiments, the polymer material may be provided in a hardened uniform pastille shape, and added to an asymmetrical jacketed centrifugal motion mixer or lightening mixer wherein the conductive heat transfer generated by high temperature steam, water or oil the speed causes the polymer material to become flowable. The organic fines are mixed with and uniformly dispersed with the polymer material creating an effective free flowing suspended mixture using asymmetrical centrifugal motion resulting in a fully dispersed liquid formula. In the final, solidified organic fuel additive the combustible organic fines are encapsulated in the polymer material. The organic fuel additive can be produced in spheres or pastilles and packed in bags or boxes for shipment to any solid fuel manufacturer.

FIG. 1 illustrates one embodiment of a process for forming the organic fuel additive according to the invention for forming the organic fuel additive. A first storage tank set to a specified stabilized temperature high enough to provide a polymer material in a liquid state but not too high so as to degrade the polymer material. For example, the temperature may be between about 150° F. and about 250° F., suitably about 175° F. to about 225° F., more suitably about 180° F. to about 200° F. and most suitably about 180° F.

The polymer material and the combustible organic fines are then disposed in a centrifugal mixer such as a variable speed mixer, to provide a full capacity fluid suspension of the combustible organic fines in the polymer material.

The mixed combustible organic fines and polymer material may be transported on a steel belt in droplets, wherein cooling water is supplied below the surface, and then transported to a micropastillator or granulator which enables the formation of pastilles or spheres as small as 1 mm in diameter.

Suitable examples of methods which may be employed to form the pastilles or spheres include, but are not limited to, fluid air encapsulation technology, rotoform pastillation, autodrop pastillation, cryogenic grinding, prilling, and so forth. The successful formation of droplets on the steel belt is dependent on the congealing temperature of the polymer.

The organic fuel additive may be mixed with or applied to the biomass raw materials using any suitable process including mixing or spraying of the organic fuel additive at an elevated temperature to the biomass. The temperature is suitably between about 40° C. and 125° C. (about 100° F. to about 260° F.).

The process employed desirably coats the entire surface area of the biomass with an average coated layer thickness of about 100 microns to about 1000 microns, suitably, about 500 μm (micrometers) or 0.0197 inches.

The biomass and organic fuel additive may then be compacted under high pressure and elevated temperatures to a size of about 1 mm to about 500 mm in any suitable geometric shape including, but not limited to, pellets, spheres, briquettes, bales, pucks, squares, and so forth The biomass raw material may comprise a lignocellulose biomass, for example, woody biomass, herbaceous biomass, fruit biomass and mixtures thereof including, but not limited to, wood, wood residue, straw, hay cellulose, grass, grains, fruit shells and mixtures thereof.

Suitable biomass raw materials may be from forestry product sources such as compacted saw dust, leftover logging material, wood chips, energy product sources such as soy pellets, palm kernel shell, coconut shell, cellulose, grass, and other types, or from agricultural products such as straw, alfalfa and corn, as well as other biomass sources such as from Domestic and Municipal Wastes.

Agricultural or harvesting residues may include, but are not limited to, cereal straws, oil see rape and linseed oil straws, flax straw, corn stalks, rice husks, sugarcane bagasse, olive residues, palm oil residues, citrus fruit residues, poultry litter, tallow and meat/bone meal.

Forestry residues include, but are not limited to, sawdusts, bark and offcuts.

Domestic and municipal wastes can be employed herein including, but not limited to, municipal solid waste, refuse-derived fuels, construction and demolition wood wastes, scrap tires, waste pallets, leaves and grass and hedge trimmings.

Energy crop residues include, but are not limited to, willow, poplar, cottonwood, switchgrass, reed canary grass and miscanthus.

More specifically, the biomass may include oak or pine, barley straw, corn stover, oat straw, wheat straw, palm kernel shells, coconut shells, grass, soy pellets, and so forth.

In some embodiments, the biomass agglomerate is an organic 'woody' raw material.

In some embodiments, the biomass is sawdust, logging residue, or mill residue as a secondary source.

Figure 2:
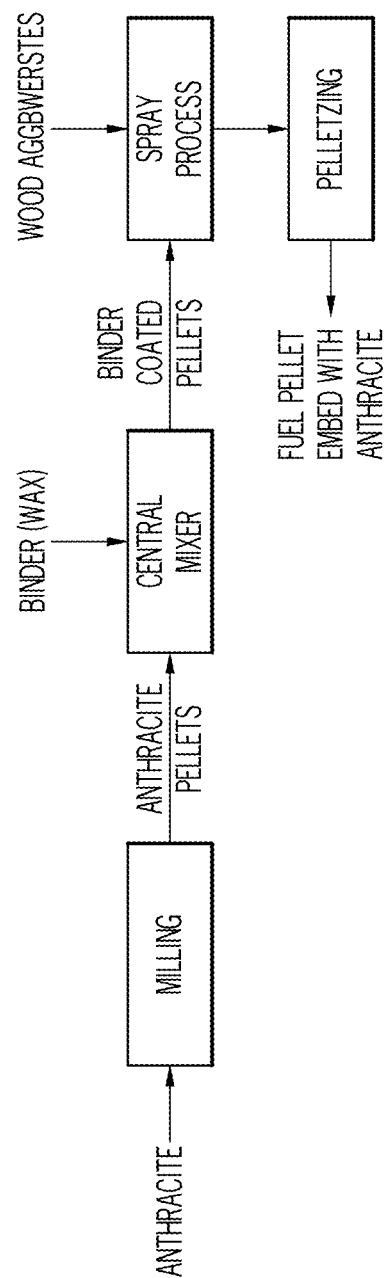
FIG. 2 is a block flow diagram illustrating a process of making and infusing the organic fuel additive into a bioenergy solid fuel product. This may be referred to as an "infused high BTU" (IHB) solid fuel product.

FIG. 2 is a block flow diagram illustrating one embodiment of a process according to the invention. In this embodiment, organic particles or fines are provided to a milling or grinding station wherein particles having a mean particle size of about 0.05 microns to about 1000 microns are produced, suitably of a relatively uniform size distribution. The organic particles or fines are then provided to a constant speed of liquid suspension using a centrifugal mixer along with a suspension of liquid polymer material and then mixed to form a fully constituted blend of polymer material and organic particles or fines to produce a mixture of the organic fuel additive.

The organic fuel additive may then be evenly blended or sprayed onto the biomass raw material at an elevated temperature and pressure. The resultant mixture can be fed to a compaction machine at an elevated temperature and pressure, wherein the organic fuel additive transforms to liquid fragments, and during compaction, is infused within the layers of biomass material to become molecularly embedded within the resultant biomass-based solid fuel product.

One example is pelletization of the biomass and organic fuel additive. It has been found that, due to the addition of the organic fuel additive, which can act as a lubricant, that the amperes required during this process can be reduced by up to about 75% as compared to pelletization of biomass without the organic fuel additive.

In some embodiments, the amperes were reduced from about 70 amps down to about 20 amps.

Figure 3:
FIG. 3 is a photograph of biomass raw material wood chips prior to milling or grinding.

FIG. 3 is a photograph illustrating wood biomass raw material prior to milling or grinding.

Figure 4:
FIG. 4 is a photograph of the biomass raw material wood after milling or grinding to a fine form.

FIG. 4 is a photograph illustrating wood biomass raw material after grinding or milling into a fine form.

Figure 5:
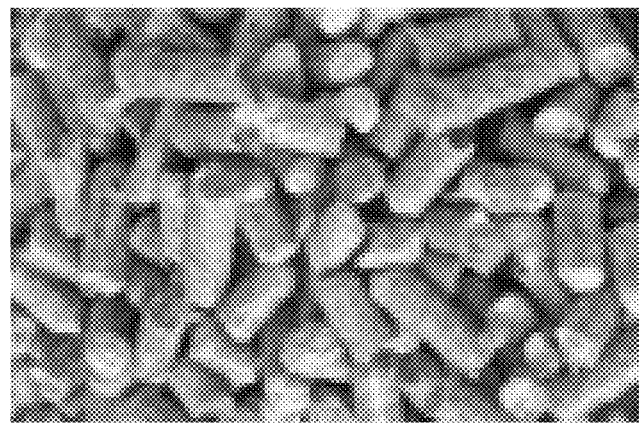
FIG. 5 is a pelletized IHB bioenergy solid fuel product wherein the biomass has been compacted and pelletized with the organic fuel additive infusing the organic fuel additive in the biomass.

FIG. 5 is a photograph illustrating bioenergy solid fuel product having the organic fuel additive infused therein in pellet form. This may also be referred to as the IHB bioenergy solid fuel product. While this embodiment illustrates the IHB bioenergy solid fuel product in pellet form, the variety of shapes that the IHB bioenergy solid fuel product may be produced as are limitless.

Figure 6:
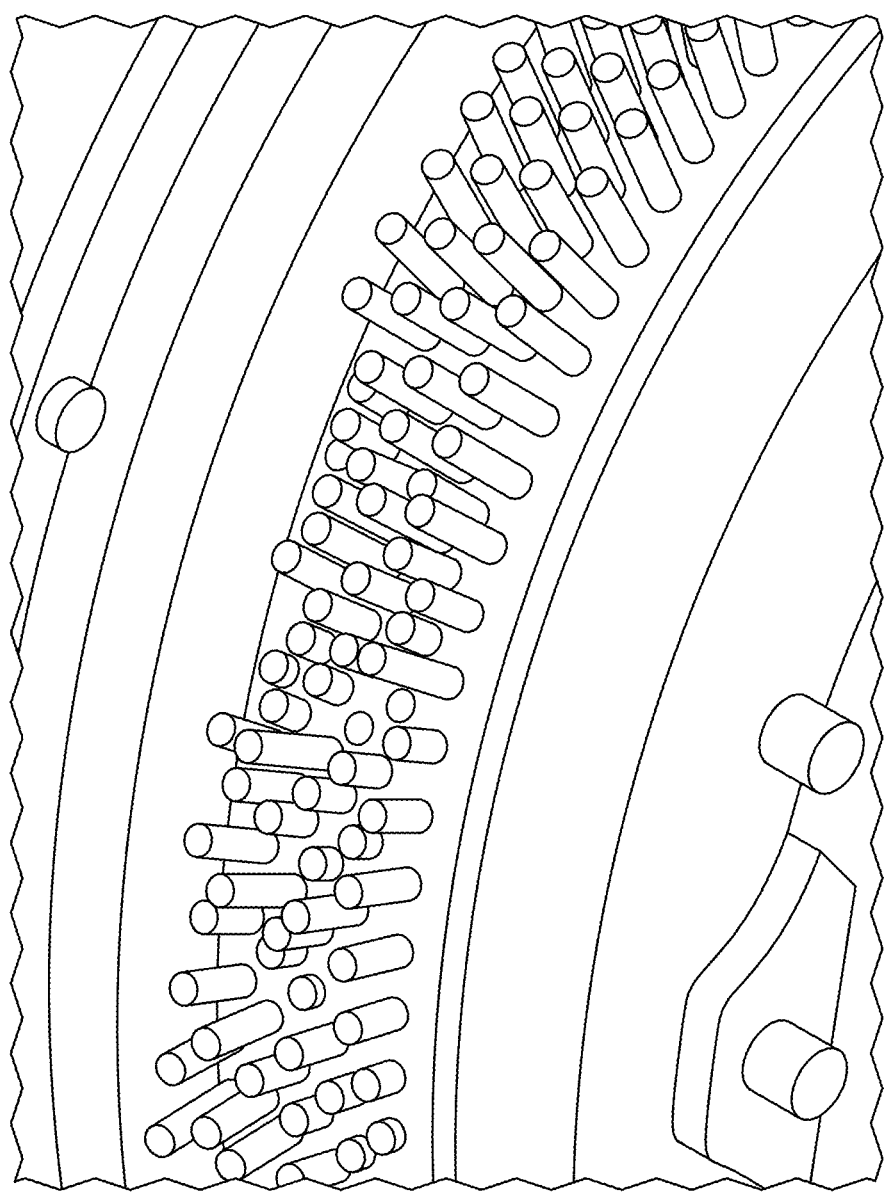
FIG. 6 is a partial perspective view of bioenergy solid fuel pellets with the organic fuel additive being formed in the compaction/pelletization zone.

FIG. 6 is a partial perspective view of bioenergy solid fuel pellets emerging from the compaction/pelletization chamber.

Figure 7:
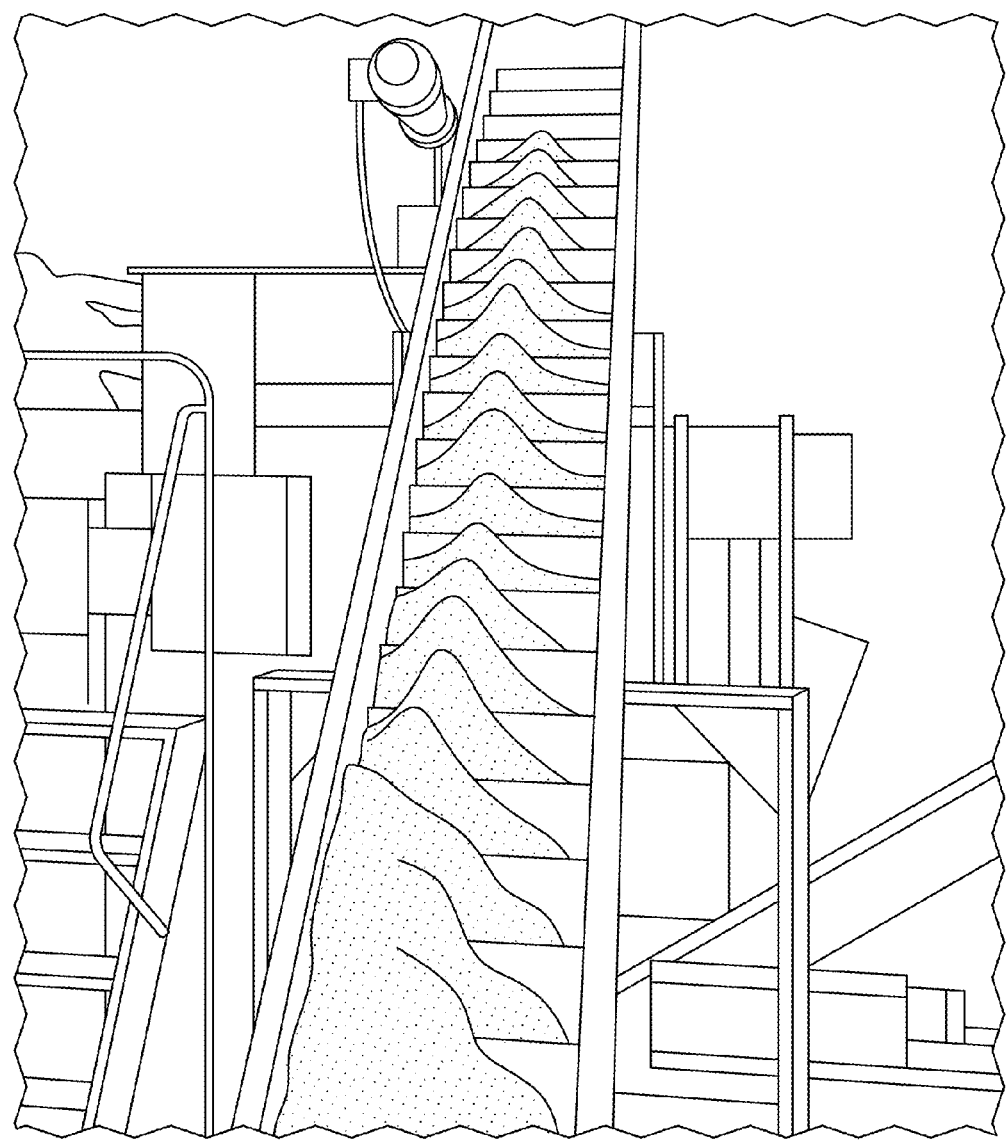
FIG. 7 is a partial perspective view of the mixture of the organic fuel additive in particle or pastille form, and the biomass raw material in fine form being transported to a compaction/pelletization machine.
Figure 8:
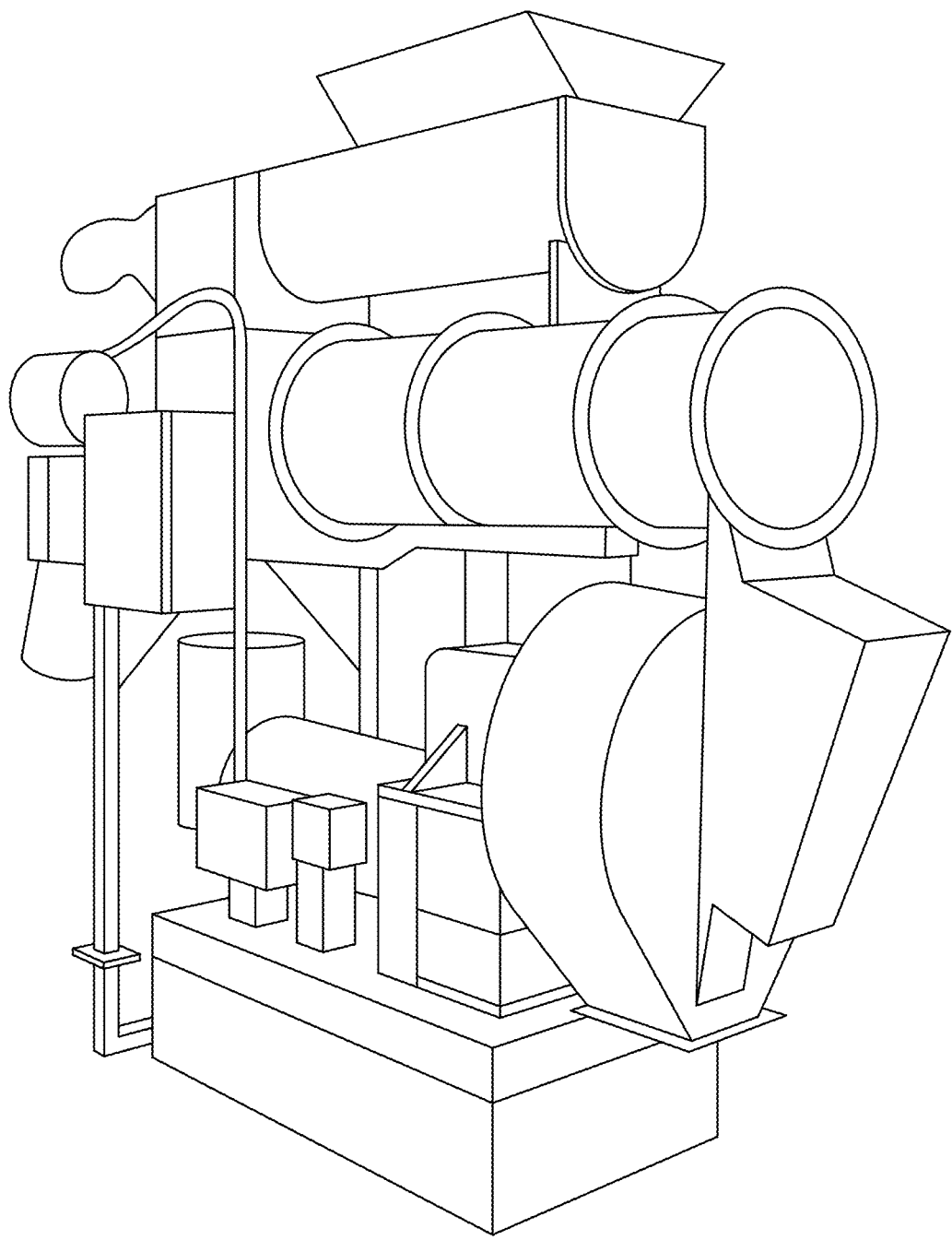
FIG. 8 is a perspective view of the compaction and pelletizing machine.

FIG. 7 is a partial perspective view of the transportation of a mixture of the organic fuel additive pastilles or spheres and the biomass raw material in fine form, in this embodiment, wood fines to a mixing/compacting/pelletizing machine shown in perspective view in FIG. 8.

This is only one example of the process disclosed herein and departures may be made without departing from the scope of the invention.

For example, while the entire process can be accomplished in a unitary process at the same point and time, it is important to note that the organic fuel additive does not have to be added to and impregnated in the resultant solid fuel product at the same point and time as the organic fuel additive is made. For example, the organic fuel additive, in sphere or pastille form, may be boxed or bagged, palletized, and then transported to any desired location where bioenergy solid fuel products of the type disclosed herein are manufactured.

Industrial solid fuel producers may blend a calculated wt-% of the organic fuel additive spheres or pastilles into exact mass amounts of biomass raw materials. For example, the organic fuel additive may be infused in the bioenergy solid fuel product in amounts of 1% to about 50% by weight, suitably about 2% to about 15% by weight and most suitably about 3% to about 10% by weight. In some embodiments, the bioenergy solid fuel product includes about 3%, 5% or 8% or 10% by weight of the organic fuel additive.

The organic fuel additive spheres and the loose biomass raw materials are then fed into a mill compaction chamber wherein the organic fuel additive spheres or pastilles are exposed to high amorphous thermoplastic temperatures of ≥100° C., and a median high compaction stress of 70 MPa, to a maximum of 300 MPa wherein the organic fuel additive spheres or pastilles are transformed into spheres or pastilles of the organic fuel additive in liquid form, and the high compaction force evenly permeates the liquid organic solid fuel additive spheres or pastilles throughout the layers of biomass raw materials, binding the materials together in a solid fuel form. The solid fuel form is then subjected to a final rapid cooling process and solidified, resulting in an increased structural strength of the resultant bioenergy fuel pellet.

This increase in molecular structural strength and the complete thorough bonding of the solid fuel additive to the biomass increases the bioenergy solid fuel product resistance to degradation to moisture during shipping, for example, overseas via ship as well as increased resistance to biodegradation. For example, the organic fuel additive shields the biomass to the changeover of microbial enzymes that produce cellobiose dehydrogenase.

EXAMPLES

Example 1 and Comparative Examples A-D: FIG. 9 is a table illustrating the difference in ash, sulfur and sulfur dioxide content, as well as the gross caloric differences between an a bioenergy solid fuel pellet having the organic fuel additive, and bioenergy solid fuel pellets having no organic fuel additive. As can be seen from the figure, the bioenergy solid fuel pellet infused with the organic fuel additive of Example 1 exhibits 10× less moisture content than those pellets shown in Comparative Examples, A (oak), B (pine), C (sawdust) and D (corn stover) and gross caloric values are more than double for Example 1 versus Comparative Examples A-D.

Examples 2-8 and Comparative Examples E and F: FIG. 10 is a table illustrating the difference in moisture, energy (BTUs) and ash % of a wood control pellet versus a wood pellet with 5% organic fuel additive, and an aspen control pellet and pellets having various amounts of organic fuel additive of 3%, 5% and 8%. Example 2 having 5% organic fuel additive exhibits lower moisture content than the control sample, Comparative E and higher energy output as measure in BTUs/lb. Examples 3-8 exhibited similar moisture content to the control sample, but also exhibited higher energy output in BTUs/lb.

FIG. 10 is also illustrative of a longer incineration period for solid fuel products with the organic fuel additive (Example 2), the IHB bioenergy solid fuel product, over solid fuel products without the organic fuel additive (Comparative Example B), and a lower resultant ash content in example 2 versus comparative example B.

FIG. 11 is a table illustrating the moisture resistance of the IHB bioenergy solid fuel product, particularly examples 3 and 4, in grams liquid/gram solid fuel product after 1 minute, 15 minutes and 60 minutes.

Figure 12:
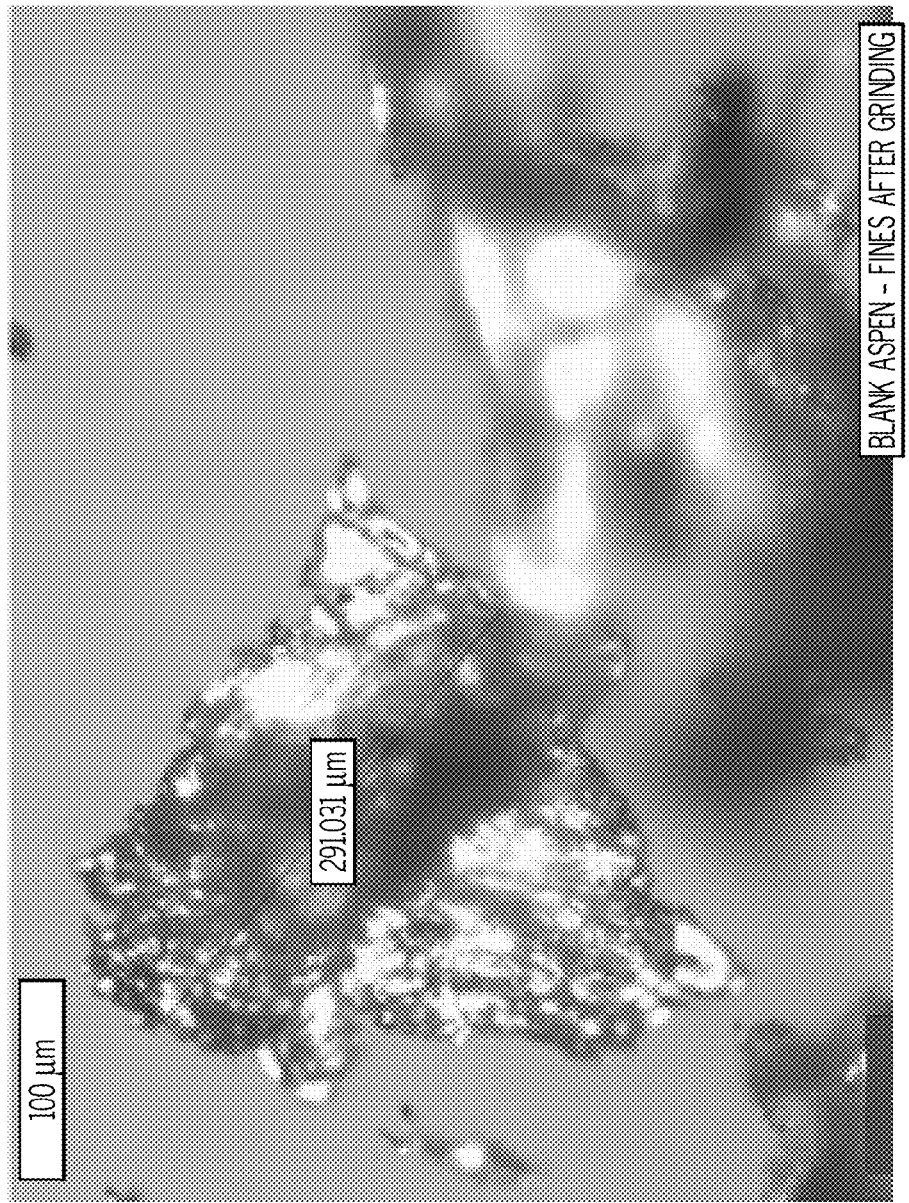
FIG. 12 is a micrograph of a biomass wood raw material in fine form prior to infusion with the organic fuel additive.

FIG. 12 is a micrograph of a biomass raw material wood particle prior to infusion with the organic fuel additive disclosed herein.

Figure 13:
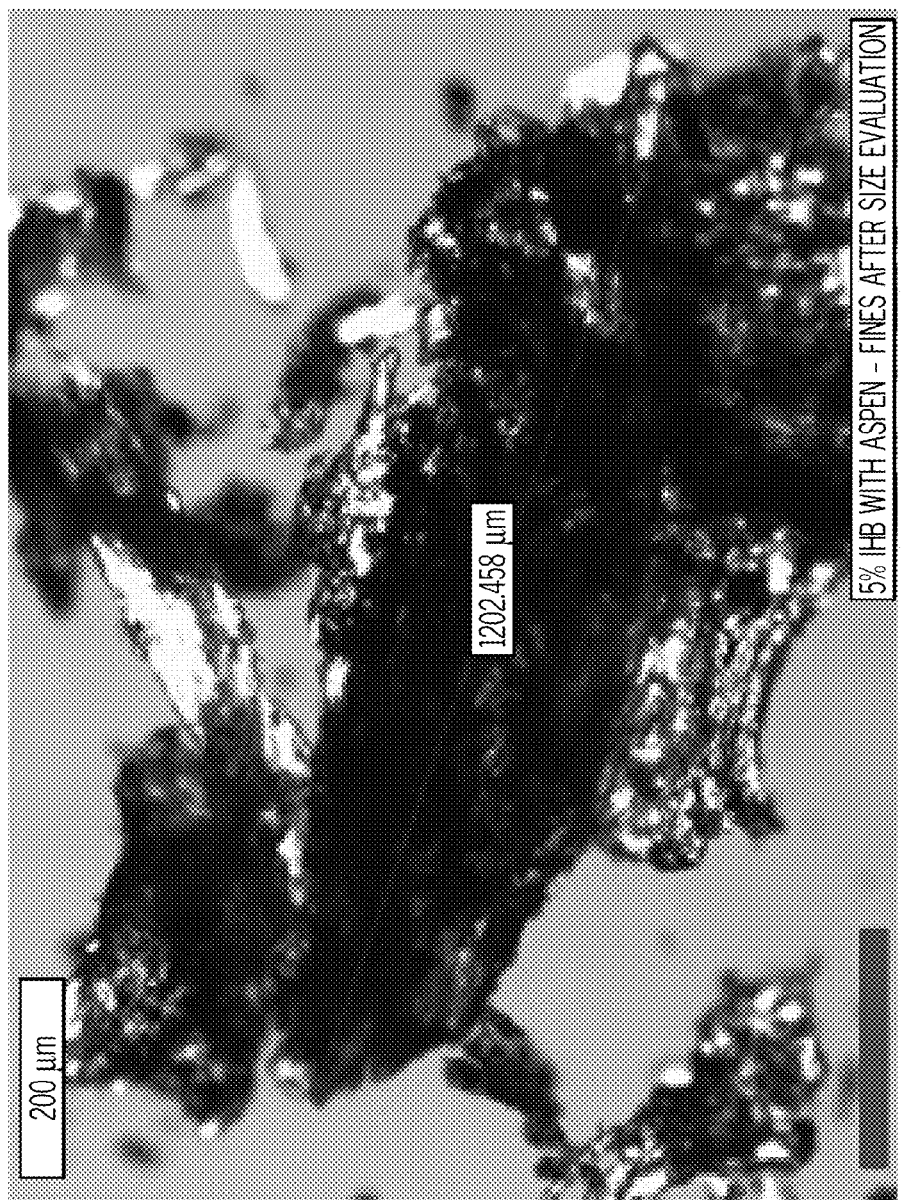
FIGS. 13-19 are micrographs illustrating the biomass wood raw material after infusion of the organic fuel additive according to the invention, namely, the IHB bioenergy solid fuel product.
Figure 14:
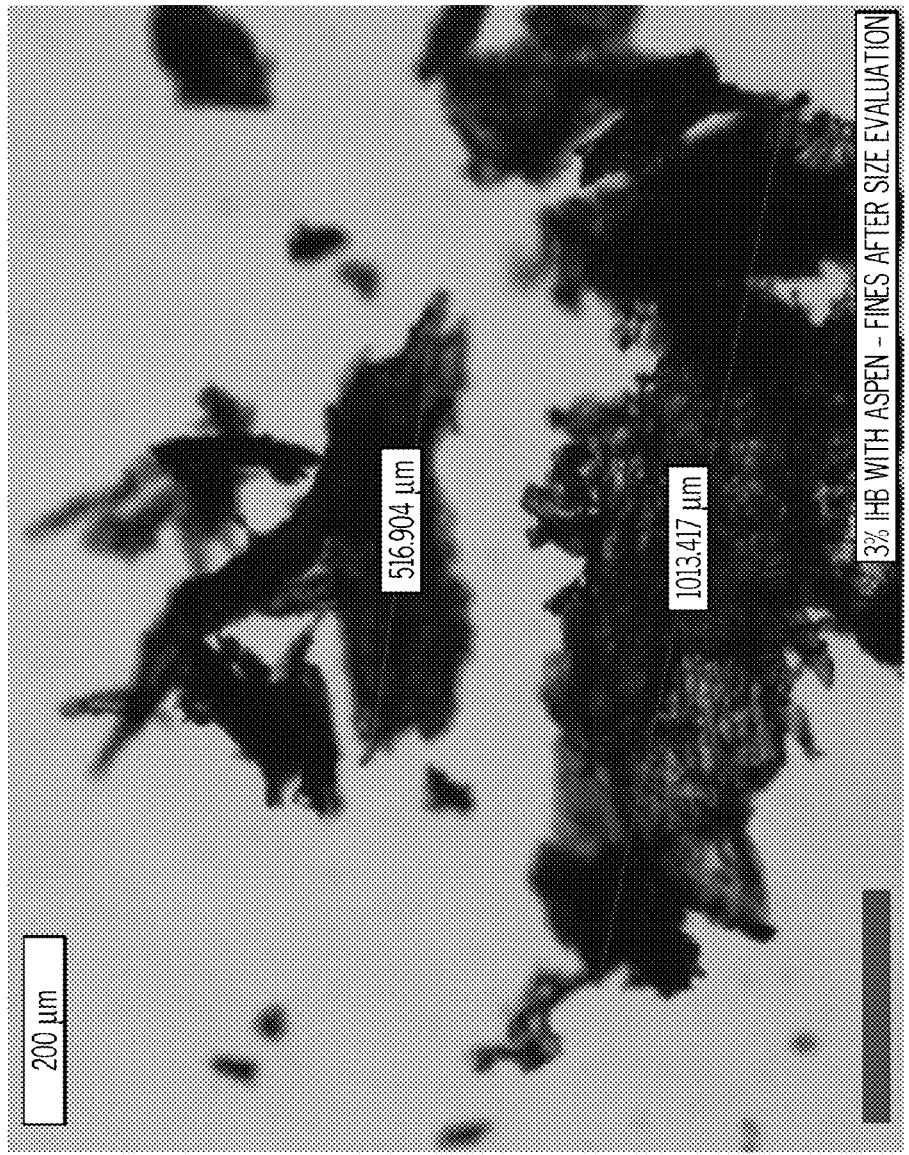

FIGS. 13-19 are micrographs illustrating various aspects of an IHB bioenergy fuel product disclosed herein. FIGS. 13 and 14 are micrographs of an IHB bioenergy fuel product after infusion of the organic fuel additive with the wood particle similar to that shown in FIG. 12. The organic fuel additive can be seen evenly permeated throughout the fibrous structure of the wood biomass particle in FIG. 13 and the complex lignin structure illuminated with anthracite agglomerates totally permeated throughout the structure is shown in FIG. 14.

Figure 15:
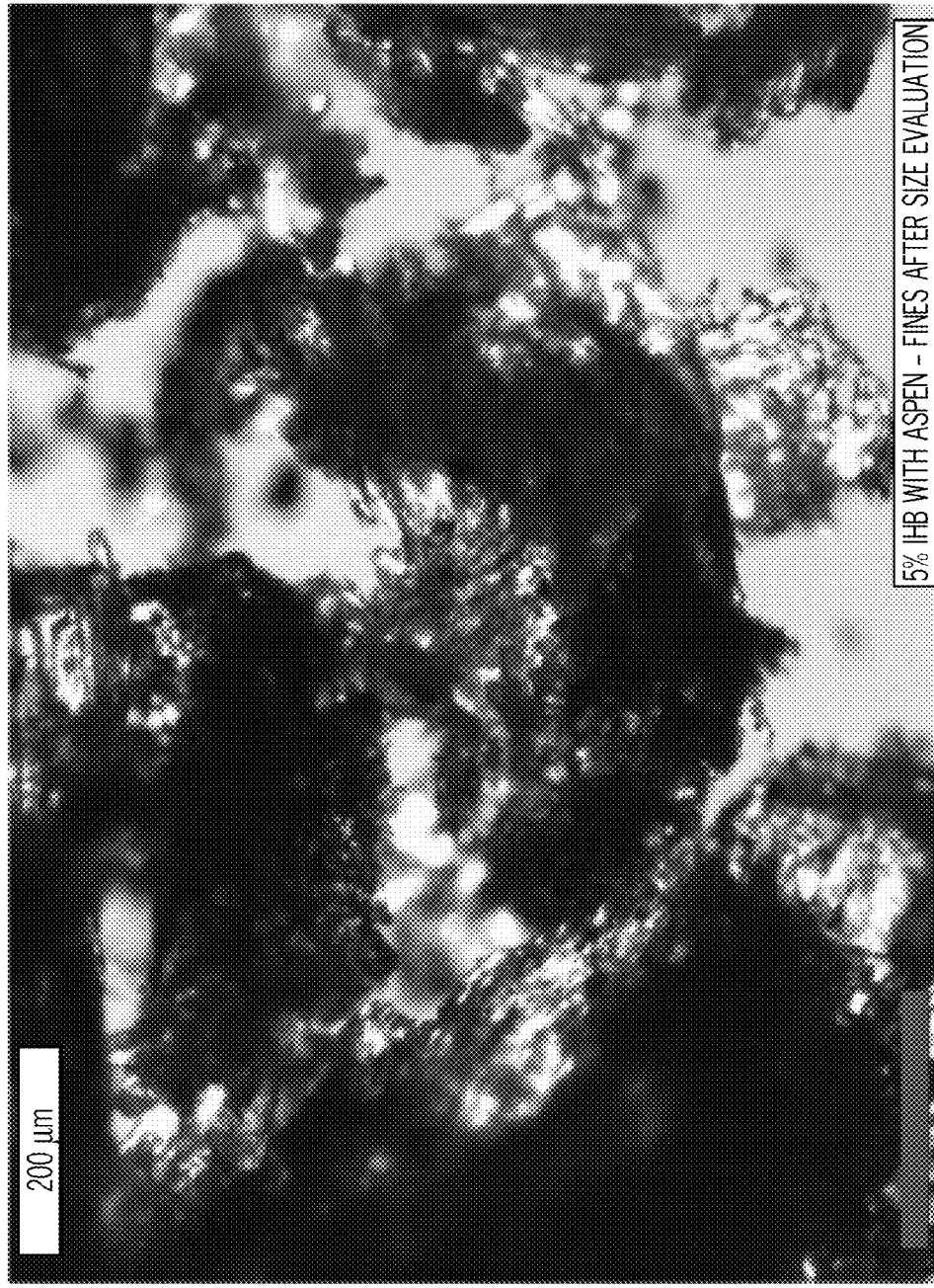
Figure 16:
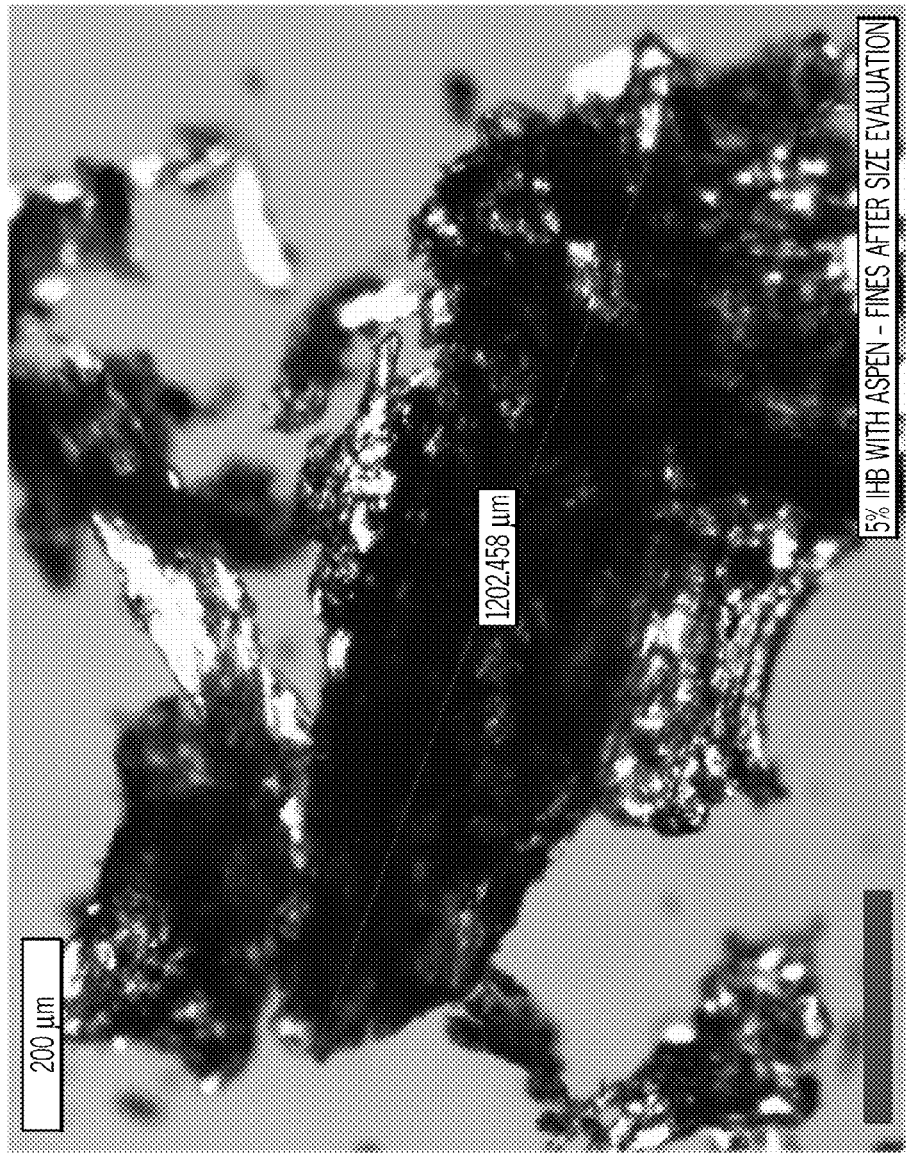

FIG. 15 is a micrograph illustrating anthracite illuminating the outer profile of lignin structure illustrating not only permeation throughout, but a coating of anthracite/polymer material on the coated lignin structure as well, and FIG. 16 illustrates the intense permeation of the organic fuel additive enhancing the shaded areas of the dense anthracite agglomerates surrounding the extremities of the lignin structure.

Figure 17:
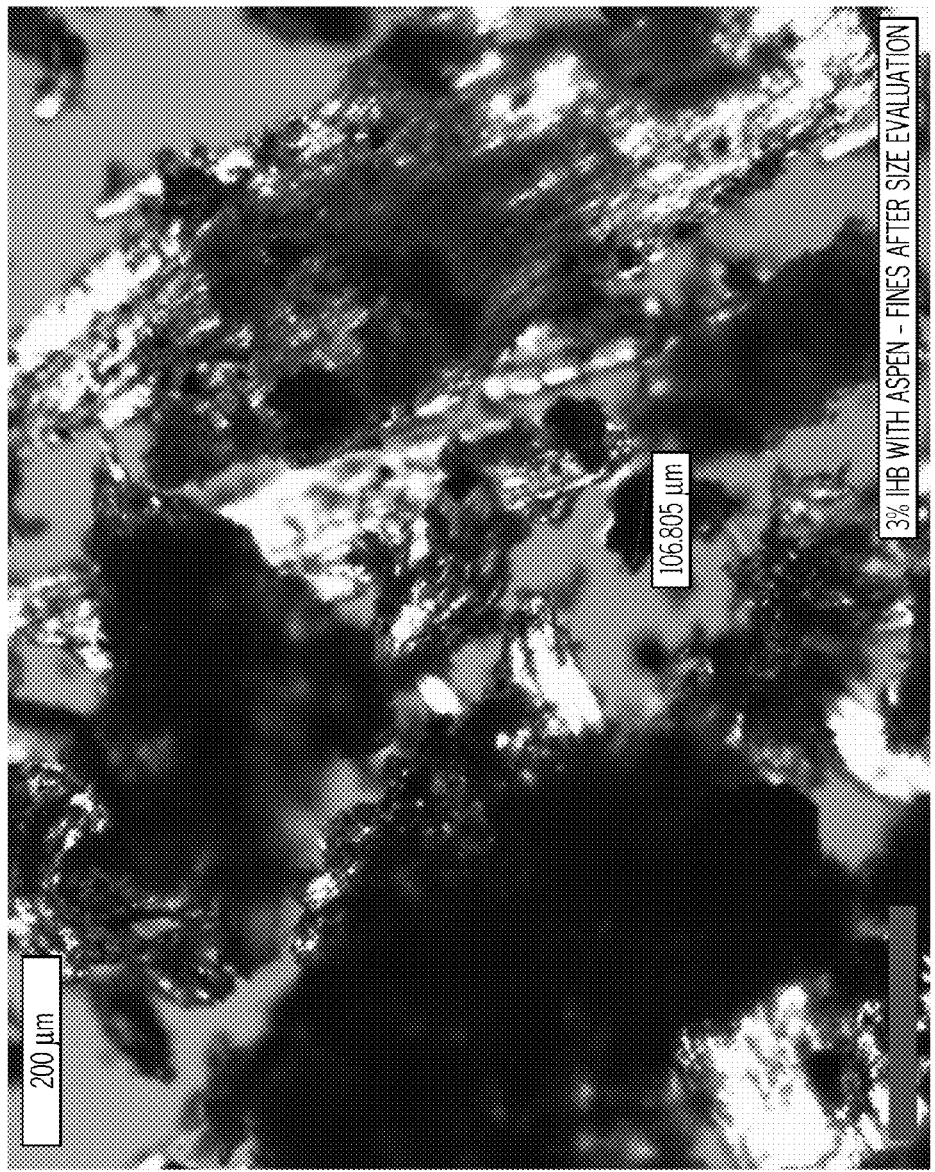

FIG. 17 is a micrograph illustrating how the process disclosed herein of compacting the biomass solid wood raw material with the organic fuel additive results in a complete bonding of anthracite to the wood fibers.

Figure 18:
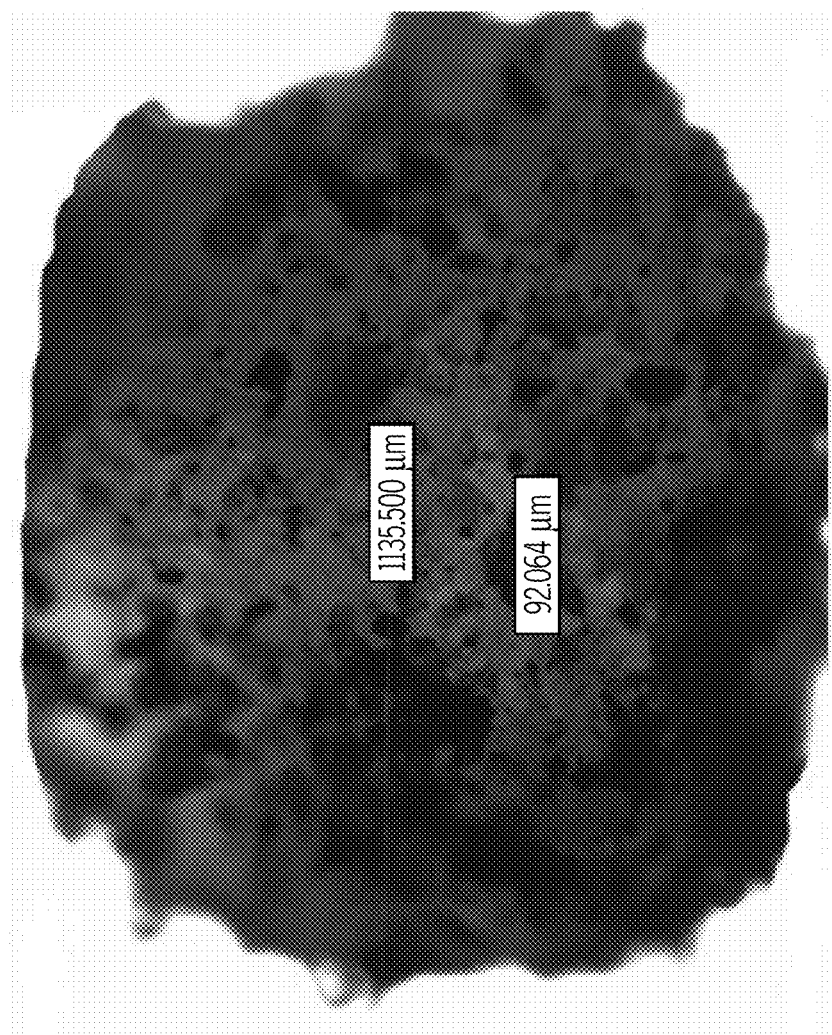

FIG. 18 is a micrograph illustrating the infusion of the organic fuel additive throughout the bioenergy solid fuel pellet. Spheres of the organic fuel additive about the size of a large grain of salt (about 2000 microns or less in size) can be seen throughout the biomass raw material.

Figure 19:
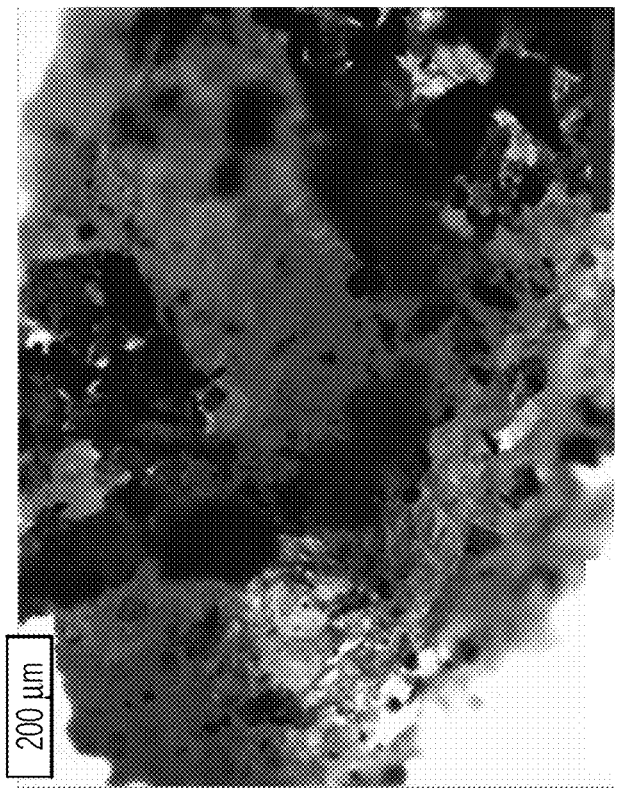

FIG. 19 is an enlarged view of an IHB bioenergy solid fuel product taken from FIG. 18.

The solid fuel product is manufactured in several types and utilized as a renewable fuel for electric power plants, homes and other applications. The bioenergy solid fuel product is extremely dense with moisture resistant contents that can prevent hydroscopic absorbsion levels below 10 wt % and therefore allow retained mass to burn longer with a persistent high combustion efficiency.

The solid organic fuel product with the organic fuel combustion additive exponentially increases the BTUs released during combustion or incineration heating.

The organic fuel additive also functions as a surface lubricant to alleviate the prolonged extreme surface friction that is generated during the compaction and shaping of bio-mass fuels.

The organic fuel additive most notably produces a significant increase of (BTU) energy output during the combustion burning of bio-mass fuels. The pyrolysis combustion of the organic fuel in combination with the organic fuel additive increases the accumulated energy in the suspended molecules of the combustible organic fines.

As the temperature in the combustion chamber increases, the number of ignited agglomerates exponentially increases and thus the kinetic energy output increases, which then produces a much more efficient breakdown of the carbon molecules of the Anthracite and promotes a more stable timed rate of combustion.

The flame velocity is also enhanced by the exponential increase of combustive heat in the chamber, which then promotes the organic raw materials and the infused mass weight of organic fuel additive to work in unison and increase the BTU output by more than 50%, in comparison to typical bio-mass fuel that does not include the organic fuel additive.

The extra heat transfer, especially radiation, also produces an efficient increase in flame temperature that remains stable longer throughout the efficient ignition and beyond to the final extinction of the mass burn off of the fuel, which results in a notable reduction of ash waste.

The end result is a reduction in power and cost to make the bioenergy solid fuel product, there is less susceptibility to moisture resulting in less waste produced due to water contamination during shipping, and the solid fuel product burns more efficiently ultimately reducing the cost of heating.

All published documents, including all US patent documents and US patent publications, mentioned anywhere in this application are hereby expressly incorporated herein by reference in their entirety. Any copending patent applications, mentioned anywhere in this application are also hereby expressly incorporated herein by reference in their entirety. Citation or discussion of a reference herein shall not be construed as an admission that such is prior art.

The description provided herein is not to be limited in scope by the specific embodiments described which are intended as single illustrations of individual aspects of certain embodiments. The methods, compositions and devices described herein can comprise any feature described herein either alone or in combination with any other feature(s) described herein. Indeed, various modifications, in addition to those shown and described herein, will become apparent to those skilled in the art from the foregoing description and accompanying drawings using no more than routine experimentation. Such modifications and equivalents are intended to fall within the scope of the appended claims.

The invention claimed is:

1. An organic fuel additive for improving the combustion of a bioenergy solid fuel product, the organic fuel additive comprising a microsphere of from 1.0 to 1.5 mm, the microsphere consisting essentially of a mixture of 50 wt. % combustible organic fines and 50 wt. % of a polymer material, wherein the combustible organic fines have a uniform particulate size distribution of from 0.05 microns to 1000 microns and are configured to be uniformly dispersed and encapsulated within the polymer material.

2. The solid fuel additive of claim 1 wherein the polymer material comprises a hydrocarbon wax.

3. The solid fuel additive of claim 2 wherein the hydrocarbon wax is a paraffin wax.

4. The solid fuel additive of claim 1 wherein said solid fuel additive is configured to be added to a biomass wherein the biomass comprises lignocellulose biomass.

5. The solid fuel additive of claim 4 wherein the biomass comprises lignocellulose biomass in the form of forestry, agricultural or energy crop biomass.

6. The solid fuel additive of claim 4 wherein the biomass comprises wood, wood residue, straw, hay cellulose, grass, grains, fruit shells and mixtures thereof.

7. The solid fuel additive of claim 1 wherein the combustible organic fines comprise an ultra high grade anthracite.

8. The solid fuel additive of claim 1 wherein the combustible organic fines comprise aspen or pine wood fines.

9. A solid fuel product comprising: 99 to 90 wt. % of a biomass; and 1 to 10 wt. % of a fuel additive for increasing the BTUs of the solid fuel product, the fuel additive comprising a microsphere of from 1.0 to 1.5 mm, said microsphere consisting essentially of 50 wt. % of combustible organic fines having a uniform particulate size distribution of 0.05 microns to 1000 microns and 50 wt. % of a polymer material, said combustible organic fines being uniformly dispersed within and encapsulated by the polymer material, said fuel additive configured to being infused into the biomass by subjecting it to temperatures of greater than or equal to 100 degrees C.

10. The solid fuel product of claim 9 wherein the biomass comprises forestry, energy crop of agricultural biomass and the combustible organic fines comprise a hard coal particulate or wood fines.

11. A method of making an organic fuel additive comprising:
providing 50 wt. % of a polymer material;
applying a temperature to the polymer material to effect a flowable liquid state of the polymer material;
mixing 50 wt. % combustible organic fines having a uniform particulate size distribution of from 0.05 microns to 1000 microns to the flowable liquid polymer material to create a free flowing full dispersed and suspended mixture of the organic fines in the polymer;
congealing the mixture at a temperature of 160 degrees F. to about 200 degrees F. to form droplets; and
forming the droplets into microspheres of from 1.0 to 1.5 mm, wherein the combustible organic fines are uniformly dispersed and encapsulated within the microspheres.

12. The method of claim 11 wherein the milling comprises ball milling, bead milling, basket milling, roller milling, jet milling, pin milling, hammer milling or jaw milling.

13. The method of claim 11 further comprising mixing with or spraying the organic fuel additive on a biomass at a temperature of from 100 degrees F. to 260 degrees F.; coating the surface area of the biomass with a thickness of about 100 microns to about 1000 microns of the organic fuel additive; and compacting the fuel additive with the biomass under high pressure and elevated temperatures to a size of about 1 mm to 500 mm to form a bioenergy solid fuel product.

14. The method of claim 13 wherein the bioenergy solid fuel product is pelletized or briquetted.

* * * * *